May 30, 1933.  V. G. APPLE  1,911,342
ELECTRIC MOTOR CONTROL FOR JUVENILE AUTOMOTIVE VEHICLES
Original Filed June 14, 1928   2 Sheets-Sheet 2
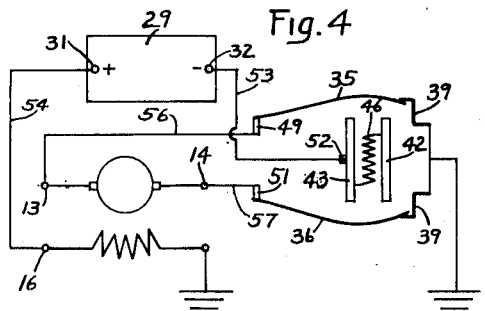
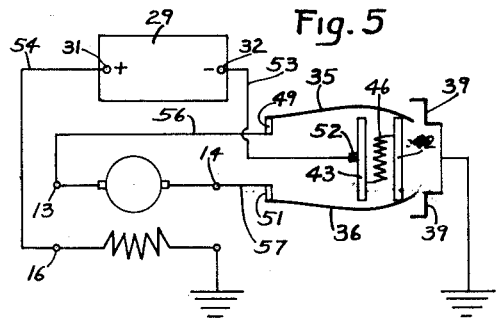
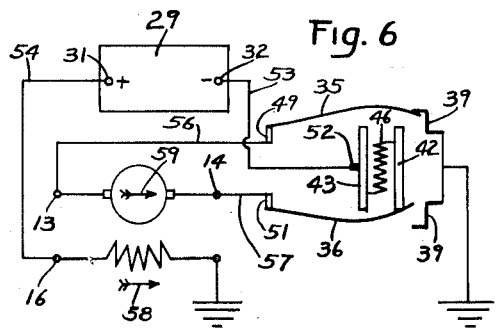
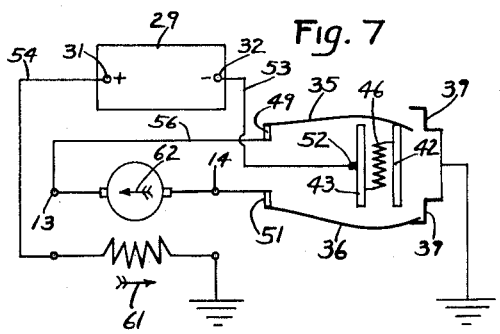
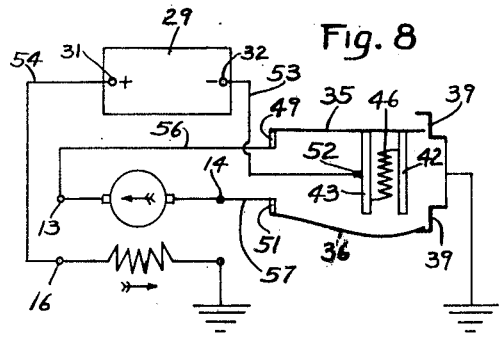
INVENTOR
Vincent G. Apple Patented May 30, 1933

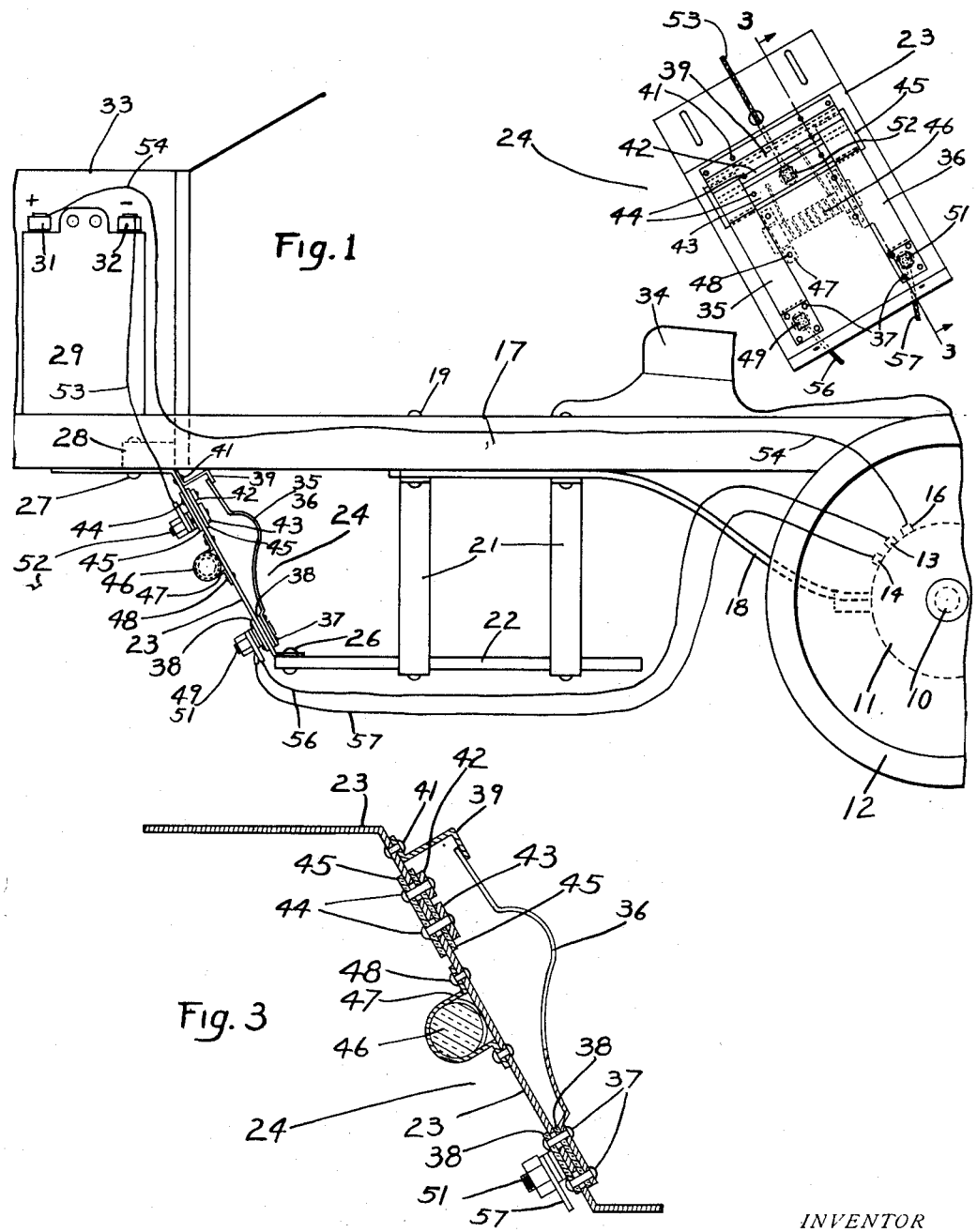

1,911,342

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

ELECTRIC MOTOR CONTROL FOR JUVENILE AUTOMOTIVE VEHICLES

Original application filed June 14, 1928, Serial No. 285,374. Divided and this application filed October 17, 1931. Serial No. 569,428.

This invention is a division of my copending application Serial Number 285,374, filed June 14th, 1928 for electric drives for juvenile automobiles and relates to improvements in electric motor controls for juvenile automobiles and particularly where a battery is employed to operate an electric motor.

The copending application referred to shows and describes the specific structure of a geared electric motor axle together with a control mechanism for operating the motor, but claims only the geared motor axle structure, while this divisional application is directed to the control mechanism only.

One of the objects of the invention is to provide a simple structure of few parts which may be produced at the low cost necessary in a device of this character.

Another object is to provide mechanism which will not readily get out of order.

Another object is to provide at low cost, a control device giving high and low speed forward and reverse.

I attain these objects by the mechanism hereinafter described and illustrated by the accompanying drawings, wherein, Fig. 1 is a side view of the framework of a juvenile automotive vehicle with a reversible geared electric motor mounted directly on the rear axle and with a battery and suitable control mechanism therefor.

Fig. 2 is a plan view of the toe board with the control mechanism attached.

Fig. 3 is a sectional view taken on the line 3—3, Fig. 2.

Figs. 4 to 8 are diagrams illustrating the operation of the control mechanism.

The side view Fig. 1 shows the frame of the vehicle with the body removed for clearness. The rear axle 10 carries a motor 11 connected in driving relation to one of the wheels 12. The motor 11 is of the series connected direct current type, winding terminals 13 and 14 being provided for the two ends of the armature circuit, and a winding terminal 16 for one end of the field circuit, the other end of the field circuit being grounded to the frame of the motor. The arrangement of the motor windings and winding terminals is that of standard practice where it is desired to operate the motor in both directions, since by reversing the direction of flow of current in the armature winding, while leaving it the same as before in the field winding reverses a series motor. The motor windings and connections being of substantially standard design the present invention is largely confined to the novel mechanism provided for connecting the circuits in the relation required.

The frame 17 is supported above the axle 10 by the cantilever springs 18 held to the frame by the bolts 19. Hangers 21 support the floor board 22. The toe board 23 carries and forms the base of the foot operated control unit 24. Toe board 23 is secured at the lower end to the floor board 22 by the bolt 26 and at the upper end by bolts 27 to a cross member 28 of the frame 17. The battery 29 having a positive terminal 31 and a negative terminal 32 is under the hood 33. A seat 34 is conveniently distanced from the toe board 23 and is secured to the frame 17.

The foot operable control unit 24 is shown in edge view in Fig. 1, in plan view in Fig. 2, in section in Fig. 3, and diagrammatically in Figs. 4 to 8, and comprises the toe board or switch base 23 with the several current connecting members secured thereto. Two pedals 35 and 36 of conduction material are secured by rivets 37 to the base 23. Pedals 35 and 36 are electrically insulated from the base 23 by squares 38 of sheet fibre placed therebetween, the openings in the base 23 through which the rivets 37 extend being larger than the rivets, so as to keep the rivets and the base electrically separated. Additional squares 38 of insulation are placed under the base to insulate all of the heads of the rivets 37 therefrom.

The pedals 35 and 36 are preferably of spring stock and tensioned to spring upward so that in their unoperated position shown in Figs. 1 and 2 their free ends are restrained from further upward movement by the Z shaped stop 39. Stop 39 is secured directly to the base 23 by rivets 41. The stop is therefore grounded to the base. Contact strips 42 and 43 are secured to base 23 by rivets 44. Sheet fibre insulating strips 45 separate the contact strips 42 and 43 from the base 23, the rivets 44 extending through enlarged holes in the base to keep them electrically separated therefrom. Additionally insulating strips 45 are placed under the base to keep all of the heads of the rivets 44 from electrical contact therewith.

Pedals 35 and 36 are so curved that when pressed downwardly they make contact first with strip 42, but when pressed with greater force will flatten out slightly and make contact also with the strip 43. A resistance coil 46 electrically connects strip 42 to strip 43. Coil 46 is wound on a spool of vitreous or similar heat resisting insulating material and is secured to the bottom of base 23 by hangers 47 held by rivets 48. Coil 46 is so spaced as to be electrically separated from the base. Three binding posts extend through base 23 but have clearance therein so as to be electrically separated therefrom. One binding post 49 is in electrical contact with the pedal 35, another binding post 51 is in electrical contact with the pedal 36, while the third binding post 52 is in electrical contact with the contact strip 43.

A cable 53 connects the binding post 52 to the negative terminal 32 of the battery 29, while another cable 54 connects the positive terminal 31 of the battery to the winding terminal 16 of the motor. Two other cables 56 and 57 connect the binding posts 49 and 51 to the motor winding terminals 13 and 14 respectively. The diagrams Figs. 4 to 8 serve to make clear the manner in which the controller may be operated to complete the several circuits.

The simplicity and safety of the controller in operation is apparent, for, when both pedals are up as in Fig. 4, both ends of the armature circuit and one end of the field circuit are grounded, but there is no connection through to the battery. If, inadvertently, both pedals are pressed down at the same time as in Fig. 5 both ends of the armature winding are connected to the same terminal of the battery but there is no ground connection to complete the circuit. To operate the motor one pedal must be down and the other up, and whichever pedal is down determines the direction of the current through the armature winding and consequently the direction of running. Thus in Fig. 6 the pedal 35 is left up and the pedal 36 is depressed. By tracing the direction of the current in Fig. 6 from the positive terminal 31 of the battery back to the negative terminal 32 it will be seen that the current flows through the field and armature in the same direction as will be indicated by the arrows 58 and 59. In Fig. 7 the pedal 36 is left up and the pedal 35 is depressed. By tracing the direction of the current in Fig. 7 from the positive terminal 31 of the battery back to the negative terminal 32 it will be seen that the current flow through the field and armature in opposite directions will be as indicated by the arrows 61 and 62. The connections made in Fig. 7 therefore revolve the motor oppositely from the connections made in Fig. 6. Figs. 6 and 7 indicate how connections are made when the pedals are depressed lightly, but in Fig. 8 is shown how a pedal may be further depressed to increase the speed of the motor. Here the pedal 35 is depressed until it flattens out and makes contact with the contact strip 43 whereupon the greater portion of the current flows from the pedal 35 to the binding post 52, through the contact strip 43, thus lowering the circuit resistance and increasing the speed of the motor. Faster speed in the opposite direction may be had by heavy pressure on the other pedal 36.

Since the direction of rotation of a series direct current motor may be reversed either by leaving the direction of the current through the field as it is and reversing the direction in the armature or by leaving the direction of the current in the armature as it is and reversing the direction in the field, it is obvious that the position of the armature and field winding in the diagram may be reversed so that the ends of the field winding would be connected to the posts 49 and 51 and the ends of the armature winding to the post 16 and to the ground.

Having described an embodiment of my invention,

I claim,

1. A controllable power unit for an electrically operated vehicle comprising an electric current supply unit, an electric motor, a winding for said motor, a second winding for said motor, and a controller comprising a metal base, a metal stop groundedly secured to said base, a metal contact strip insulatedly secured to said base, a second metal contact strip insulatedly secured to said base, a resistance coil electrically connecting the first said contact strip to the second said contact strip, two sheet spring metal pedal strips each having one end insulatedly secured to said base and the other end normally sprung upward into contact with said stop, each manually depressible independently of the other away from said stop and into engagement with said contact strips, the pedal strips being so curved that engagement will be had with the first said contact strip ahead of the second said contact strip, and electrical conductors connecting opposite terminals of the first said windings one end to each of said pedal strips, other electrical conductors connecting opposite terminals of the current supply unit one end to a terminal of the second winding and the other end to the second said contact strip, the other terminal of the second said winding being grounded.

2. A controllable power unit for an electrically operated vehicle comprising an electric current supply unit, an electric motor, a winding for said motor, a second winding for said motor, and a controller comprising a metal base, a metal strip groundedly secured to said base, a metal contact strip insulatedly secured to said base, two sheet spring metal pedal strips each having one end insulatedly secured to said base and the other end normally sprung upward into contact with said strip, each manually depressible independently of the other away from said stop and into engagement with said contact strip, and electrical conductors connecting opposite terminals of the first said winding one end to each of said pedal strips, other electrical conductors connecting opposite terminals of the current supply unit one end to a terminal of the second winding and the other end to the said contact strip, the other terminal of the second said winding being grounded.

3. A controllable power unit for an electrically operated vehicle comprising a current supply unit, an electric motor, a winding for said motor, a second winding for said motor, two binding posts, a metal stop, two metal contact strips, two independently operable metal pedal members each having one end connected to one of said binding posts and the other end resiliently held against said metal stop, and each being independently operable away from said metal stop into engagement with one metal contact strip by slight manual pressure, and into engagement with the second metal contact strip by heavier manual pressure, a resistance coil connecting the first and second said metal contact strips, and electrical conductors connecting the one terminal of the first said winding to one of said binding posts and the other terminal of the first said winding to the other said binding post, other electrical conductors connecting the one terminal of the current supply unit to one end of the second said winding and the second terminal of the current supply unit to the second said contact strip, and still other conductive means connecting the second end of the second said winding to the metal stop.

4. A controllable power unit for an electrically operated vehicle comprising a current supply unit, an electric motor, a winding for said motor, a second winding for said motor, a metal stop, two metal contact strips, two independently operable metal pedal members each resiliently held against said metal stop, and each being independently operable away from said metal stop into engagement with one metal contact strip by slight manual pressure, and into engagement with the second metal contact strip by heavier manual pressure, a resistance coil connecting the first and second said metal contact strips, and electrical conductors connecting the one said winding one end to one of said metal switch members and the other end to the other said metal switch members, other conductors connecting the one terminal of the current supply unit to one end of the second said winding and the second terminal of the current supply unit to the second said contact strip, and still other conductive means connecting the second end of the second said winding to the metal stop.

5. A controllable power unit for an eletrically operated vehicle, comprising a current supply unit, an electric motor, a winding for said motor, a second winding for said motor, two binding posts, a metal stop, a metal contact strip, two independently operable metal pedal members each having one end connected to one of said binding posts and the other end resiliently held against said metal stop, and each being independently operable away from said metal stop into engagement with said metal contact strip, and conductors connecting the one terminal of the first said winding to one of said binding posts, and the other terminal of the first said winding to the other said binding post, other conductors connecting the one terminal of the current supply unit to one terminal of the second said winding, and the other terminal of the current supply unit to the said contact strip, and other conductive means connecting the other terminal of the second said winding to the metal stop.

6. A controllable power system comprising, a current supply unit, an electric motor, a winding for said motor, a second winding for said motor, a metal stop, a metal contact strip, two independently movable metal switch members each normally resiliently held against said metal stop and each being independently operable away from said metal stop into engagement with said metal contact strip, and conductors connecting the first said winding the one end to one of said metal switch members and the other end to the other said metal switch member, other conductors connecting the one terminal of the current supply unit to one terminal of the second said winding, and the other terminal of the current supply unit to the said contact strip, the other conductive means connecting the other terminal of the second said winding to the metal stop.

7. A controllable power system comprising, a current supply unit, an electric motor, a winding for said motor, a second winding for said motor, a metal stop, a metal contact strip, two independently movable conductive members each in permanent electrical contact with one end of the first said winding and in resilient contact with said stop and each independently operable away from said stop into engagement with said contact strip, the second winding being electrically connected the one end to said stop and the other end to one terminal of the current supply unit, the other end of the supply unit being electrically connected to said contact strip.

8. A controllable power system comprising, a current supply unit, an electric motor, a winding for said motor, a second winding for said motor, and a controller for said motor comprising a metal contact strip, two movable conductive members both normally grounded and one electrically connected to each terminal of the first said winding, both said movable members being independently operable away from said ground connection into engagement with said metal contact strip, conductors connecting one terminal of the current supply unit to the one terminal of the second said winding, the other terminal of the second said winding being grounded, and another conductor connecting the second terminal of the current supply unit to the said contact strip.

In testimony whereof I affix my signature.

VINCENT G. APPLE.